J. R. Steer,
Cotton Bale Tie.
No. 2491. Reissued Feb. 19. 1867.
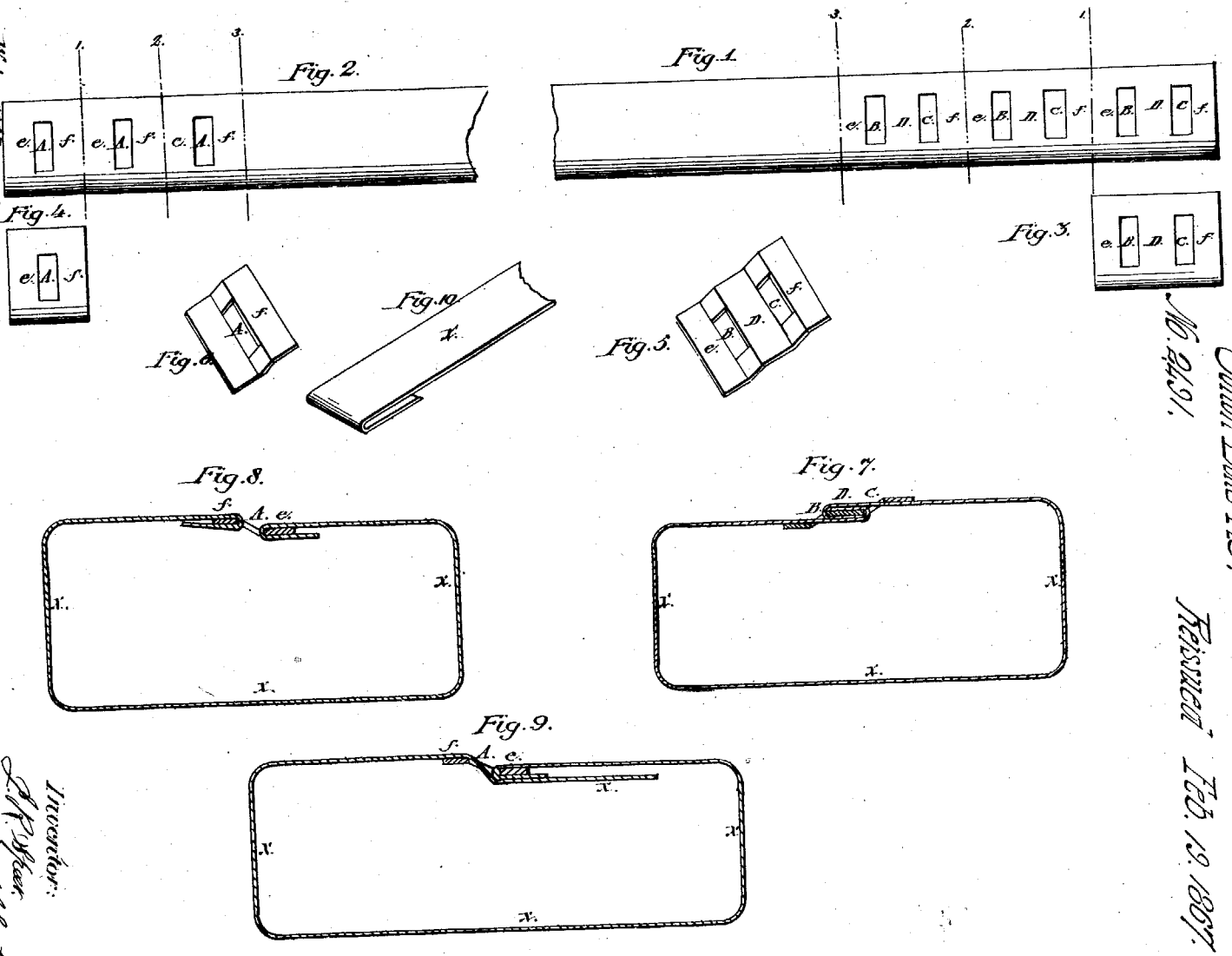
Witnesses:
John Johnston
A. C. Johnston
Inventor:
J. R. Steer.
by J. Johnston.
Attys.
N. PETERS, PHOTO-LITHOGRAPHER, WASHINGTON, D. C.

UNITED STATES PATENT OFFICE.

JAMES R. SPEER, OF PITTSBURG, PENNSYLVANIA.

IMPROVEMENT IN CLASPS FOR METALLIC HOOPS.

Specification forming part of Letters Patent No. 18,779, dated December 1, 1857; Reissue No. 2,491, dated February 19, 1867.

*To all whom it may concern:*

Be it known that I, JAMES R. SPEER, of Pittsburg, in the county of Allegheny and State of Pennsylvania, have invented a new and useful Improvement in Clasps for Metallic Bands, for baling or packing cotton, hemp, wool, and other articles which are packed in bales or bundles; and I do hereby declare that the following is a full and exact description thereof, reference being had to the accompanying drawings, and to the letters of reference marked thereon.

The nature of my invention consists in furnishing a cheap, efficient, and durable clasp for metallic bands used for baling cotton or other material, said clasp being provided with one or more apertures adapted to the form of the band-iron, so that the band may be hooked to, looped on, or clamped in said clasp with ease and facility.

To enable others skilled in the art to make and use my invention, I will proceed to describe its construction and operation.

In the accompanying drawings, Figures 1 and 2 represent face views of flat bars of iron from which the clasps are formed, said iron having a number of apertures made in it. Figs. 3 and 4 represent the clasps when cut, as indicated by lines 1, 2, and 3, from the flat bar of iron, as shown in Figs. 1 and 2. Figs. 5 and 6 represent the form of the clasps when bent across the apertures, so as to present a sufficient opening for the ready insertion of the hooked, looped, or straight ends of the bands. Fig. 7 represents the band when looped onto the center part of the clasp shown in Figs. 1, 3, and 5. Fig. 8 represents the band secured to and hooked on the clasp shown in Figs. 2, 4, and 6. Fig. 9 represents one end of the band hooked on the clasp, and the straight end of the band inserted in the aperture of the clasp. Fig. 10 represents a section of the band in perspective, showing the form of the hook on the end of the band.

In the drawings, Figs. 7, 8, and 9 represent three of the many modes of attaching, connecting, uniting, or securing the ends of the bands *x* with my improved clasp. I take flat bars of iron, about No. 12, of the desired width, and punch or cut out openings or apertures A, B, and C, which apertures should be about four-tenths of an inch wide and about one inch long. I then cut the bars, which have been provided with the desired apertures, into parts, as indicated by the lines marked 1, 2, and 3, and thereby make clasps of the form shown in Figs. 3 and 4, which clasps can readily be used in connection with bands provided with hooked ends, as shown in Fig. 10.

For the purpose of providing means for the easy insertion of the ends of the bands *x*, and also for the purpose of providing a ready means for hooking in, looping on, or clamping down the ends of the bands with and by the clasp, I bend the clasp across the openings or apertures A, B, and C in the manner represented in Figs. 5, 6, 7, 8, and 9. The degree of the bend or angle made in the clasp I leave to the taste, skill, and desire of the manufacturer or those who may use the clasp. The size of the clasp and its opening or openings and the thickness, width, and kind of iron used in making it are matters which I also leave to the manufacturer and those who may use my clasp, for the size of the clasp and openings must correspond to the thickness and width of the band of iron, and its thickness and width must depend on the kind of iron used, for the clasp can be made of cast, malleable, or wrought iron.

The means used and manner or mode adopted for making my clasp are matters which properly belong to the mechanic and manufacturer, who will readily provide the necessary machinery or apparatus for making and giving the desired form to the clasp.

The manner of using my improved clasp is as follows: One end of the band is secured to, hooked in, or looped on the part marked *f*, as shown in Fig. 8. The band is then applied or adjusted on the bale in the ordinary manner, and the cotton or other article is compressed to the desired size. Then the other end of the band is passed through the opening A and hooked to the part of the clasp marked *e*, as shown in Fig. 8.

The band may be secured in the manner shown in Fig. 9, which represents one end of the band hooked on the part of the clasp marked *e*, and the other end of the band passed over the part of the clasp marked *f* and through the opening A, and then under the part marked *e*.

The mode of using the clasp with two openings, as shown in Fig. 7, is to pass the ends of the bands through the openings B and C, and hook or loop them on the part of the clasp marked D.

Other modes of using the clasp in connection with the bands will readily be suggested to the mind of the operator without further description as to the manner of using my improvement in metallic clasps for iron bands used in baling cotton or other articles.

Having thus described the nature, construction, and operation of my improvement, what I claim as of my invention is—

A clasp provided with an aperture or apertures, and so bent across said aperture or apertures as to present an opening or openings for the easy insertion of the ends of the bands or hoops, and form an efficient clasp for securing the ends of the band or hoop, substantially as herein described, and for the purpose set forth.

JAMES R. SPEER.

Witnesses:
JAMES J. JOHNSTON,
ALEXANDER HAYS.